US011076250B2

(12) United States Patent
Nakadai et al.

(10) Patent No.: US 11,076,250 B2
(45) Date of Patent: Jul. 27, 2021

(54) MICROPHONE ARRAY POSITION ESTIMATION DEVICE, MICROPHONE ARRAY POSITION ESTIMATION METHOD, AND PROGRAM

(71) Applicant: HONDA MOTOR CO., LTD., Tokyo (JP)

(72) Inventors: Kazuhiro Nakadai, Wako (JP); Katsuhiro Dan, Yokohama (JP); Katsutoshi Itoyama, Wako (JP); Kenji Nishida, Tsukuba (JP)

(73) Assignee: HONDA MOTOR CO., LTD., Tokyo (JP)

( * ) Notice: Subject to any disclaimer, the term of this patent is extended or adjusted under 35 U.S.C. 154(b) by 34 days.

(21) Appl. No.: 16/790,264

(22) Filed: Feb. 13, 2020

(65) Prior Publication Data

US 2020/0275224 A1  Aug. 27, 2020

(30) Foreign Application Priority Data

Feb. 27, 2019  (JP) ............................. JP2019-034898

(51) Int. Cl.
*H04R 29/00* (2006.01)
*G06F 17/18* (2006.01)
(Continued)

(52) U.S. Cl.
CPC .......... *H04R 29/005* (2013.01); *G06F 17/18* (2013.01); *H04R 3/005* (2013.01); *H04R 5/04* (2013.01)

(58) Field of Classification Search
CPC ................ H04R 3/005; H04R 2499/13; H04R 2201/405
(Continued)

(56) References Cited

U.S. PATENT DOCUMENTS

| 7,991,167 B2 * | 8/2011 | Oxford | H04R 3/005 |
| | | | 381/92 |
| 2008/0306739 A1 * | 12/2008 | Nakajima | G10L 21/028 |
| | | | 704/270 |

(Continued)

FOREIGN PATENT DOCUMENTS

JP  2012-161071  8/2012

OTHER PUBLICATIONS

Buchner et al, Simultaneous Localization of Multiple Sound Sources Using Blind Adaptive MIMO Filtering,2005, IEEE, pp. 97-100 (Year: 2005).*

(Continued)

*Primary Examiner* — Alexander Krzystan
(74) *Attorney, Agent, or Firm* — Rankin, Hill & Clark LLP

(57) ABSTRACT

A microphone array position estimation device includes an estimation unit that estimates a position X of a microphone array for maximizing a simultaneous probability P(X,S,Z) of X, Y, and Z through repeated estimation of S and X when the position of the microphone array constituted by M (M is an integer of 1 or greater) microphones is set to $X (=(X_1^T, \ldots, X_M^T)^T$, T indicates a transposition), spectrums of sound source signals output by the N (N is an integer of 1 or greater) sound sources are set to S (a set related to all of n, f, and t of $S_{nft}$, f is a frequency bin, and t is a frame index), and spectrums of recorded signals collected by the microphone array are set to Z (a set related to all of f and t of $Z_{ft}$).

6 Claims, 7 Drawing Sheets

US 11,076,250 B2
Page 2

(51) Int. Cl.
*H04R 3/00* (2006.01)
*H04R 5/04* (2006.01)

(58) Field of Classification Search
USPC .......................... 381/92, 122, 71.4, 86, 71.12
See application file for complete search history.

(56) References Cited

U.S. PATENT DOCUMENTS

| | | | |
|---|---|---|---|
| 2014/0142958 A1* | 5/2014 | Sharma | G10L 19/02 704/500 |
| 2019/0114489 A1* | 4/2019 | Jackson | G06K 9/6289 |
| 2019/0174237 A1* | 6/2019 | Lunner | H04R 25/43 |
| 2020/0275224 A1* | 8/2020 | Nakadai | H04R 5/04 |

OTHER PUBLICATIONS

Hiroaki Miura et al., SLAM-based Online Calibration of Asynchronous Microphone Array for Robot Audition, RSJ International Conference on Intelligent Robots and Systems, IEEE, 2011, pp. 524-529, English text, 6 pages.

* cited by examiner

FIG. 3

$$\begin{cases} \text{1. RANDOMLY INITIALIZE } X^{(0)} \text{ AND } S^{(0)} \\ \quad \textbf{repeat} \\ \qquad 2. X^{(t+1)} \leftarrow \underset{X}{\arg\max} \log P(X, S^{(t)}|Z) \\ \qquad 3. S^{(t+1)} \leftarrow \underset{S}{\arg\max} \log P(X^{(t+1)}, S|Z) \\ \quad \text{UNTIL CONVERGENCE} \end{cases}$$

FIG. 8

|  | DISPLACEMENT IN x-AXIS DIRECTION [$m$] | DISPLACEMENT IN y-AXIS DIRECTION [$m$] |
| --- | --- | --- |
| CASE 1 | 0.02 | −0.002 |
| CASE 2 | 0.02 | 0.02 |

MICROPHONE ARRAY POSITION ESTIMATION DEVICE, MICROPHONE ARRAY POSITION ESTIMATION METHOD, AND PROGRAM

CROSS-REFERENCE TO RELATED APPLICATION

Priority is claimed on Japanese Patent Application No. 2019-034898, filed Feb. 27, 2019, the content of which is incorporated herein by reference.

BACKGROUND OF THE INVENTION

Field of the Invention

The present invention relates to a microphone array position estimation device, a microphone array position estimation method, and a program.

Description of Related Art

In a voice recognition process, a microphone array constituted by a plurality of microphones is used. For example, in a sound source localization process and a sound source separation process, a transfer function representing the relationship between a sound source and a microphone array is measured in advance, and the processes are performed using the transfer function. For this reason, in a case where a microphone array is used, it is necessary to accurately know the disposition of each of the microphones. However, even when the position of the microphone is accurately measured, the position may deviate when the microphone is actually used. In a case where the position of the microphone deviates, the positions of the sound source and the microphone in the measured transfer function deviate, and thus the transfer function becomes inappropriate.

As a result, in a case where the position of a microphone deviates, the accuracy of the sound source localization process, the sound source separation process, and the like is reduced.

For this reason, it has been proposed that a transfer function be estimated when a microphone array is used. For example, an extended method in which a simultaneous localization and mapping (SLAM) technique, known as a simultaneous estimation problem for the self-position of a robot and a map, is regarded as a problem of simultaneously estimating the positions of a microphone and a sound source has been proposed (see, for example, "SLAM-based Online Calibration of Asynchronous Microphone Array for Robot Audition", Hiroaki Miura, Takami Yoshida, Keisuke Nakamura, and Kazuhiro Nakadai, RSJ International Conference on Intelligent Robots and Systems, IEEE, 2011, p 524-529 (hereinafter, Non-Patent Document 1)).

Further, in Japanese Unexamined Patent Application, First Publication No. 2012-161071 (hereinafter, Patent Document 1), it has been proposed that the position of a sound source be estimated simultaneously with the input of a voice signal by incrementally estimating the position of the sound source, the position of each microphone, and deviation of a synchronization time whenever a sound from a moving sound source is observed using a microphone array, and updating estimated values such that an estimation error including deviation of a synchronization time is minimized.

In the techniques disclosed in Patent Document 1 and Non-Patent Document 1, the position of each microphone is calibrated using a signal with a precise rise timing such as applause or using sound source position information.

SUMMARY OF THE INVENTION

However, in the techniques disclosed in Patent Document 1 and Non-Patent Document 1, there is a possibility that a rise will not be accurately detected in an actual noise environment and that it may not be possible to impart sound source position information.

An aspect according to the present invention is contrived in view of the above-described problem, and an object thereof is to provide a microphone array position estimation device capable of accurately estimating the position of a microphone array, a microphone array position estimation method, and a program.

In order to solve the above-described problem, the present invention adopts the following aspects.

(1) A microphone array position estimation device according to an aspect of the present invention includes an estimation unit configured to estimate a position X of a microphone array for maximizing a simultaneous probability P(X,S,Z) of X, Y, and Z through repeated estimation of S and X when the position of the microphone array constituted by M (M is an integer of 1 or greater) microphones is set to X $(=(X_1^T, \ldots, X_M^T)^T$, T indicates a transposition), spectrums of sound source signals output by the N (N is an integer of 1 or greater) sound sources are set to S (a set related to all of n, f, and t of $S_{nft}$, f is a frequency bin, and t is a frame index), and spectrums of recorded signals collected by the microphone array are set to Z (a set related to all off and t of $Z_{ft}$).

(2) In the above-described aspect (1), the estimation unit may estimate the position X of the microphone array by randomly initializing $X^{(0)}$ and $S^{(0)}$ and then performing repeated estimation until the following two expressions are converged.

$$X^{(t+1)} \leftarrow \underset{X}{\mathrm{argmax}}\ \log P(X, S^{(t)} | Z)$$

$$S^{(t+1)} \leftarrow \underset{X}{\mathrm{argmax}}\ \log P(X^{(t+1)}, S | Z)$$

(3) In the above-described aspect (2), the estimation unit may estimate the position X of the microphone array by estimating $\hat{X}$ for maximizing the following function using grid search.

$$\hat{X} = \underset{X}{\mathrm{argmax}}\ \log P(X, S, Z)$$
$$= \underset{X}{\mathrm{argmax}}\Big(\log P\big(Z | S, X\big) + \log P(X)\Big)$$

(4) In the above-described aspect (2) or (3), the estimation unit may set a probability model of a probability P(X,S,Z) to be the following expression on the basis of a space model, $$\log P(X,S,Z) \stackrel{c}{=} \log P(Z|S,X) + \log P(S) + \log P(X)$$

may set a first term log P(Z|S,X) on the right side to be the following expression (sign c above an equal sign is an equal sign indicating that the right side and the left side are correct except for a constant term, * represents a complex conjugate, and $\sigma_Z^2$ represents a variance of a recorded signal of the microphone array) on the assumption that it conforms to a complex normal distribution in which a product of the spectrum S of the sound source signal and a transfer function $R_{nmf}$ is set to an average, $$\log P(Z|S,X) \stackrel{c}{=} -\sum_m \sum_f \sum_t \frac{\left(Z_{mft} - \sum_n R_{nmf} S_{nft}\right)^* \left(Z_{mft} - \sum_n R_{nmf} S_{nft}\right)}{\sigma_Z^2}$$

may set a second term log P(S) on the right side to be the following expression ($\sigma_S^2$ represents a variance of a spectrum of a sound source signal) on the assumption that it conforms to a complex normal distribution in which $S_{nft}$ is set to an average of 0, and $$\log P(S) \stackrel{c}{=} -\sum_n \sum_f \sum_t \frac{S_{nft}^* S_{nft}}{\sigma_S^2}$$

may set a third term log P(X) on the right side to be the following expression ($\sigma^2$ represents a variance of a microphone array position) on the assumption that relative positions of the microphones constituting the microphone array are independent of each other for each microphone, and displacements of the microphones at the position X are in the same direction, and the position X of the microphone array conforms to a normal distribution in which $\bar{X}$ is set to an average.

$$\log P(X) = \sum_m \log P(X_m)$$
$$\stackrel{c}{=} -\sum_m \frac{(X_m - \bar{X}_m)^T (X_m - \bar{X}_m)}{2\sigma^2}$$

(5) A microphone array position estimation method according to another aspect of the present invention includes a procedure of causing a microphone counting unit to acquire the number of microphones (M is an integer of 1 or greater) included in a microphone array, a procedure of causing a sound source counting unit to acquire the number of sound sources N (N is an integer of 1 or greater), a procedure of causing a first short-time Fourier transformation unit to perform short-time Fourier transformation on a sound source signal for each sound source to calculate a spectrum of the sound source signal, a procedure of causing a second short-time Fourier transformation unit to perform short-time Fourier transformation on a recorded signal for each microphone to calculate a spectrum of the recorded signal, and a procedure of causing an estimation unit to estimate a position X of a microphone array for maximizing a simultaneous probability P(X,S,Z) of X, Y, and Z through repeated estimation of S and X when the position of the microphone array is set to X ($=(X_1^T, \ldots, X_M^T)^T$, T indicates a transposition), spectrums of sound source signals output by the N sound sources are set to S (a set related to all of n, f, and t of $S_{nft}$, f is a frequency bin, and t is a frame index), and spectrums of recorded signals collected by the microphone array are set to Z (a set related to all off and t of $Z_{ft}$), by using the number of sound sources N, the number of microphones M, the spectrums of the sound source signals, the spectrums of the recorded signals, and a probabilistic generation model used to estimate the position X of the microphone array.

(6) A non-transitory computer-readable storage medium according to still another aspect of the present invention stores a program causing a computer for microphone array position estimation to execute a procedure of acquiring the number of microphones (M is an integer of 1 or greater) included in a microphone array, a procedure of acquiring the number of sound sources N (N is an integer of 1 or greater), a procedure of performing short-time Fourier transformation on a sound source signal for each sound source to calculate a spectrum of the sound source signal, a procedure of performing short-time Fourier transformation on a recorded signal for each microphone to calculate a spectrum of the recorded signal, and a procedure of estimating a position X of a microphone array for maximizing a simultaneous probability P(X,S,Z) of X, Y, and Z through repeated estimation of S and X when the position of the microphone array is set to X ($=(X_1^T, \ldots, X_M^T)^T$, T indicates a transposition), spectrums of sound source signals output by the N sound sources are set to S (a set related to all of n, f, and t of $S_{nft}$, f is a frequency bin, and t is a frame index), and spectrums of recorded signals collected by the microphone array are set to Z (a set related to all off and t of $Z_{ft}$), by using the number of sound sources N, the number of microphones M, the spectrums of the sound source signals, the spectrums of the recorded signals, and a probabilistic generation model used to estimate the position X of the microphone array.

According to the above-described aspects (1) to (6), it is possible to accurately estimate positions of microphones constituting a microphone array when recording is performed using the microphones.

BRIEF DESCRIPTION OF THE DRAWINGS

FIG. 3 is an algorithm of repeated estimation of X and S according to the embodiment.

FIG. 8 is a diagram showing a displacement in an x-axis direction and a displacement in a y-axis direction in evaluation in Case 1 and evaluation in Case 2.

DETAILED DESCRIPTION OF THE INVENTION

Figure 1:
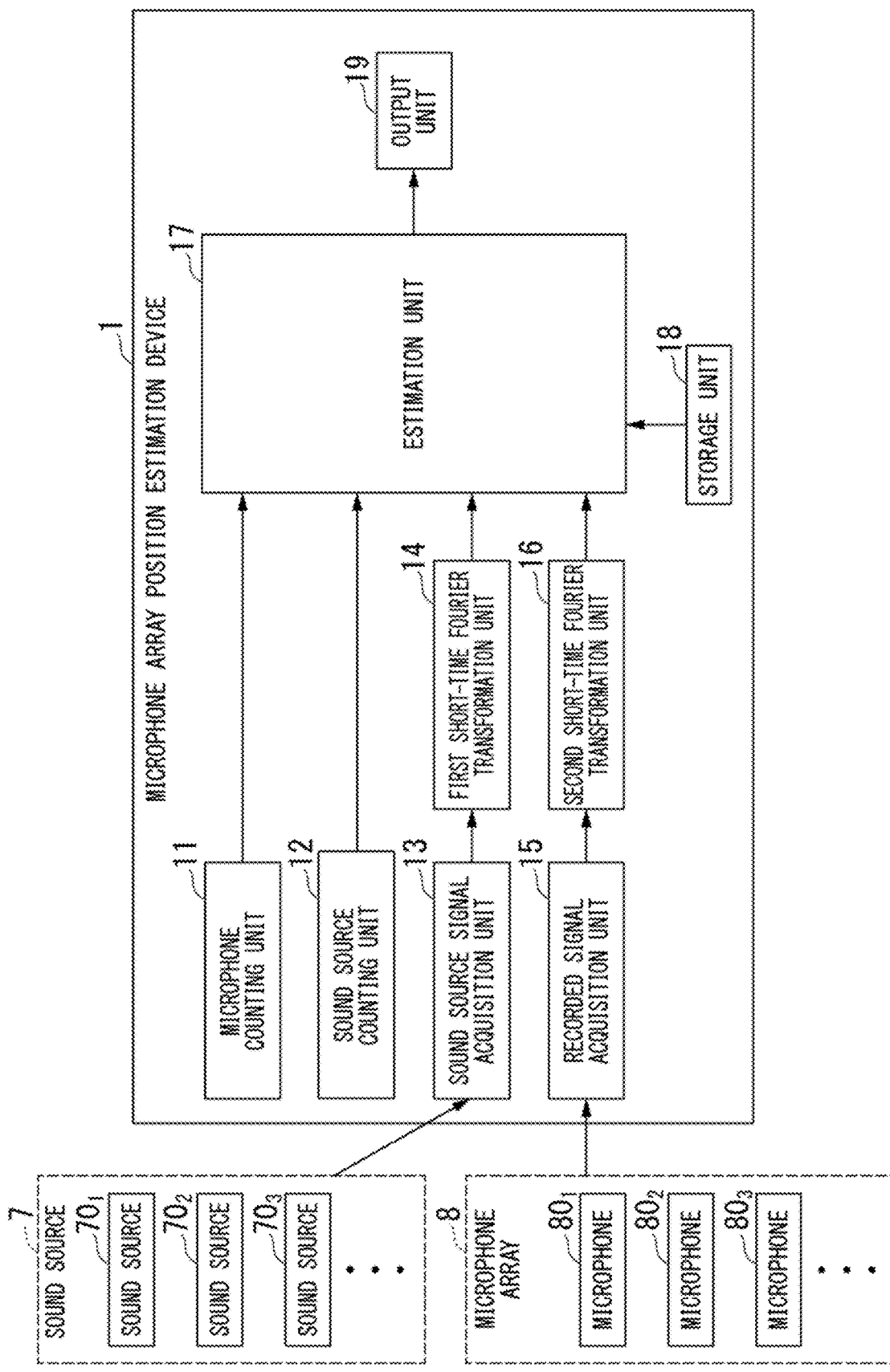
FIG. 1 is a block diagram showing a configuration example of a microphone array position estimation device according to an embodiment.

Hereinafter, a preferred embodiment of the present invention will be described with reference to the accompanying drawings. In the drawings used in the following description, the scale of each member may have been appropriately changed in order to be recognized.

FIG. 1 is a block diagram showing a configuration example of a microphone array position estimation device 1 according to the present embodiment.

As shown in FIG. 1, the microphone array position estimation device 1 includes a microphone counting unit 11, a sound source counting unit 12, a sound source signal acquisition unit 13, a first short-time Fourier transformation unit 14, a recorded signal acquisition unit 15, a second short-time Fourier transformation unit 16, an estimation unit 17, a storage unit 18, and an output unit 19.

In addition, the sound source 7 includes N sound sources $70_1, 70_2, \ldots,$ and $70_N$. The microphone array 8 includes M microphones $80_1, 80_2, \ldots,$ and $80_M$. In a case where one of the N sound sources $70_1, 70_2, \ldots,$ and $70_N$ is not specified in the following description, the sound sources will be referred to as sound sources 70. Further, when one of the microphones $80_1, 80_2, \ldots,$ and $80_M$ is not specified, the microphones will be collectively referred to as microphones 80. The shape of the microphone array is not limited to a circular shape, and any shape or arrangement may be adopted.

The microphone counting unit 11 acquires the number of microphones and outputs the acquired number of microphones to the estimation unit 17.

The sound source counting unit 12 acquires the number of sound sources and outputs the acquired number of sound sources to the estimation unit 17.

The sound source signal acquisition unit 13 acquires a sound signal output by the sound source 70 (hereinafter, referred to as a sound source signal) and outputs the acquired sound source signal to the first short-time Fourier transformation unit 14.

The first short-time Fourier transformation unit 14 converts a sound source signal output by the sound source signal acquisition unit 13 into a signal in a frequency region to calculate a spectrum of the sound source signal. The first short-time Fourier transformation unit 14 calculates a spectrum of a sound source signal for each sound source. The first short-time Fourier transformation unit 14 outputs the calculated spectrum of the sound source signal to the estimation unit 17.

The recorded signal acquisition unit 15 acquires a recorded signal of an M channel which is collected by the microphone array 8 and outputs the recorded signal of the M channel to the second short-time Fourier transformation unit 16.

The second short-time Fourier transformation unit 16 converts the recorded signal of the M channel which is output by the recorded signal acquisition unit 15 into a signal in a frequency region to calculate a spectrum of a sound source signal. The second short-time Fourier transformation unit 16 calculates a spectrum of a recorded signal for each microphone 80. The second short-time Fourier transformation unit 16 outputs the calculated spectrum of the recorded signal to the estimation unit 17.

The estimation unit 17 acquires the number of microphones output by the microphone counting unit 11, the number of sound sources output by the sound source counting unit 12, a spectrum of a sound source signal output by the first short-time Fourier transformation unit 14, and a spectrum of a recorded signal output by the second short-time Fourier transformation unit 16. The estimation unit 17 estimates the positions of the microphones 80 constituting the microphone array 8 on the basis of the number of microphones, the number of sound sources, the spectrum of the sound source signal, and the spectrum of the recorded signal which are acquired, using a probability model stored in the storage unit 18. In the following description, the position of the microphone array (hereinafter, also referred to as a microphone array position) is a set including the positions of the respective microphones. The estimation unit 17 outputs the estimated microphone array position to the output unit 19.

The output unit 19 outputs the microphone array position output by the estimation unit 17 to the voice recognition device 2. The output destination may be another external device (for example, a display device, a sound source localization device, a sound source separation device, or the like). In addition, information to be output may include identification information for identifying a microphone.

[Description of Probabilistic Generation Model]

A technique for calibrating the position of a microphone according to the present embodiment will be described assuming that the position of the microphone 80 deviates in the microphone array 8.

Figure 2:
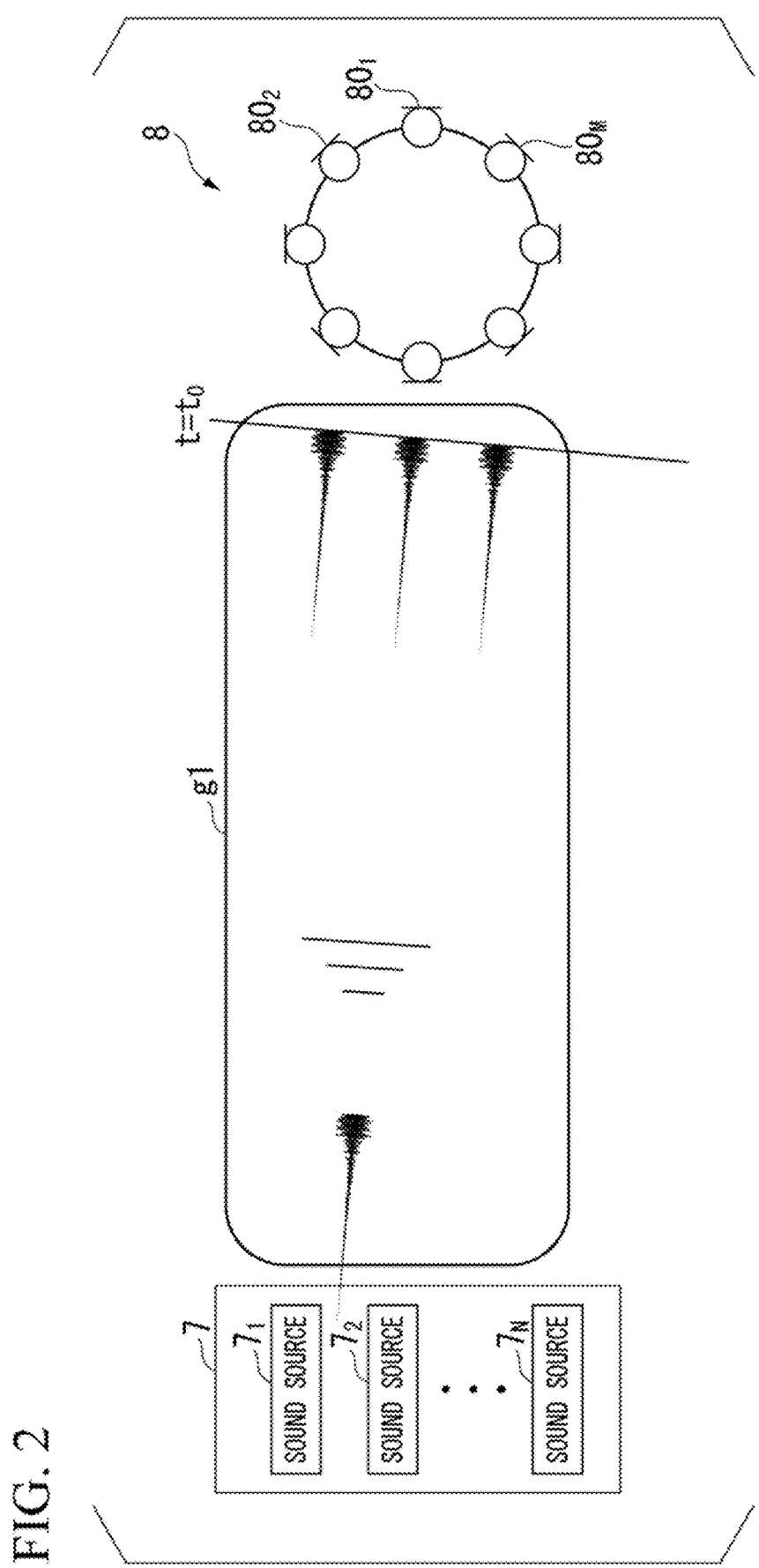
FIG. 2 is a diagram showing a space model of a microphone array.

FIG. 2 is a diagram showing a space model of a microphone array. Reference number g1 denotes a transfer function from a sound source to a microphone. As shown in FIG. 1, the way of transmitting a sound from the sound source 7 to the microphone 80 is determined by the position and direction of the sound source 7 and the position of the microphone 80.

When sound signals output from the N sound sources 70 are collected by the microphone array 8 constituted by the M microphones 80, a signal from an n-th (n is an integer between 1 and N) sound source $70n$ is represented as $s_n$. In addition, a recorded signal of an m-th (m is an integer between 1 and M) microphone $80_m$ is represented as $z_m$. In addition, a complex spectrum obtained by performing short-time Fourier transformation on $s_n$ is represented as $S_{nft}$, and a complex spectrum obtained by performing short-time Fourier transformation on $z_m$ is represented as $Z_{mft}$. Additionally, f is a frequency bin, and t is a frame index. In addition, a transfer function is set to be $R_{nf}=(R_{n1f}, \ldots, R_{nMf})^T$. Here, $R_{nmf}$ is a transfer function between the m-th microphone $80_m$ and the n-th sound source $70_n$. Further, the position of the m-th microphone $80_m$ is set to be $X_m=(x_m, y_m)^T$, and the position X of the microphone 80 is set to be $X=(X_1^T, \ldots, X_M^T)^T$. In addition, T represents inversion.

In a frequency region, an observation spectrum $Z_{ft}$ of an observation signal recorded by the microphone array is represented by a product of a transfer function $R_{nf}$ and a spectrum $S_{nft}$ of a sound source signal as shown in the following Expression (1).

$$Z_{ft}=\Sigma_n R_{nf} S_{nft} \qquad (1)$$

Since the spectrum and the signal transmission process of an actual sound source signal includes random noise and fluctuations, a probabilistic generation model is used for modeling an observation signal and a sound source signal. The probabilistic generation model is constituted by a spectrum of the recorded signal, a spectrum of the sound source signal, and a model of the microphone position.

Here, the spectrum of the sound source signal is represented as S (a set related to all of f and t of $S_{nft}$), the spectrum of a recorded signal is represented as Z (a set related to all of n, f, and t of $Z_{ft}$), a prior probability of a microphone position X is represented by P(X), and a prior probability of a spectrum S of a sound source signal is represented by P(S). In addition, the conditional probability of the spectrum Z of the recorded signal when the microphone position X and the spectrum S of the sound source signal are given is represented by P(Z|S,X).

In the present embodiment, microphone array position information X^ for maximizing a logarithmic posterior probability P(X,S|Z) of a spectrum S of a sound source signal and a microphone array position X with respect to a spectrum Z of a recorded signal of the microphone array 8 is estimated.

Here, according to Bayes' theorem, the relationship of argmax $_{(X,S)}$P(X,S|Z)=argmax $_{(X,S)}$P(X,S,Z) (subscripts below argmax are shown as suffixes) is established.

The arguments of the maxima (abbreviated argmax) are the points, or elements, of the domain of some function at which the function values are maximized.

A simultaneous probability of the microphone position X, the spectrum S of the sound source signal, and the spectrum Z of the recorded signal in P(X,S,Z) can be expressed as shown in the following Expression (2).

$$\log P(X,S,Z) = \log P(Z|S,X) + \log P(S) + \log P(X) \quad (2)$$

Here, since P(X,S,Z)=P(Z|S,X)P(S)P(X), a distribution is assumed for each term.

First, the first term on the right side in Expression (2) will be described. As described above, P(Z|S,X) is a conditional probability of the spectrum Z of the recorded signal when the microphone position X and the spectrum S of the sound source signal are given.

Assuming that it conforms to a complex normal distribution in which a product of the spectrum S of the sound source signal and the transfer function $R_{nmf}$ is an average, the first term log P(Z|S,X) on the right side can be expressed as shown in the following Expression (3).

$$\log P(Z|S,X) \stackrel{c}{=} -\sum_m \sum_f \sum_t \frac{\left(Z_{mft} - \sum_n R_{nmf}S_{nft}\right)^* \left(Z_{mft} - \sum_n R_{nmf}S_{nft}\right)}{\sigma_Z^2} \quad (3)$$

In the Expression (3), the equal sign with the letter c about it indicates that the right side and the left side are correct except for a constant term. In addition, * represents a complex conjugate, and $\sigma_Z^2$ represents the variance of a recorded signal of the microphone array.

Next, the second term on the right side of Expression (2) will be described. As described above, P(S) is a prior probability of the spectrum S of the sound source signal.

Assuming that it conforms to a complex normal distribution in which $S_{nft}$ is an average of 0, log P(S) on the right side of the expression can be expressed as shown in the following Expression (4).

$$\log P(S) \stackrel{c}{=} -\sum_n \sum_f \sum_t \frac{S^*_{nft} S_{nft}}{\sigma_S^2} \quad (4)$$

In Expression (3), $\sigma_S^2$ represents a variance of a spectrum of a sound source signal.

Next, the third term on the right side of Expression (2) will be described. P(X) is the prior probability of a microphone array position, and P($X_m$) is the prior probability of an m-th microphone position $X_m$.

It is assumed that relative positions of the microphones are independent of each other for each microphone, and the displacements at the microphone position are in the same direction. That is, assuming that the position X of the microphone array conforms to a normal distribution in which $\overline{X}$ is the average, the third term log P(X) on the right side can be represented as shown in the following Expression (5).

$$\log P(X) = \sum_m \log P(X_m) \quad (5)$$

$$\stackrel{c}{=} -\sum_m \frac{(X_m - \overline{X}_m)^T (X_m - \overline{X}_m)}{2\sigma^2}$$

In Expression (4), $\sigma^2$ represents the variance of a microphone array position, and $\overline{X}_m$ represents a reference position of the m-th microphone 80$_M$.

The above-described Expressions (2) to (5) are probabilistic generation models.

[Estimation of Microphone Position]

Next, a technique according to the present embodiment for estimating microphone array position information X^ to maximize a logarithmic posterior probability log P(X,S|Z) of a spectrum S and a microphone array position X of a sound source signal with respect to a spectrum Z of a recorded signal of the microphone array 8 will be described. Here, the microphone array position information X^ and the posterior probability of the spectrum S of the sound source signal are not independent of each other, and thus maximum posterior probability estimation (MAP estimation) is realized by repeated estimation of the spectrum S of the sound source signal.

In this manner, in the present embodiment, the estimation unit 17 estimates a microphone position for maximizing a posterior probability when a spectrum S of a recorded signal is given, on the basis of the above-described probabilistic generation model.

FIG. 3 is an algorithm of repeated estimation of X and S according to the present embodiment.

As shown in FIG. 3, first, $X^{(0)}$ and $S^{(0)}$ are randomly initialized. Next, substitution of argmax$_x$ log P(X,$S^{(t)}$|Z) (subscripts below argmax are shown as suffixes) for $X^{(t+1)}$ and substitution of argmax$_S$ log P($X^{(t+1)}$,S|Z) for $S^{(t+1)}$ are repeated until convergence.

According to the algorithm shown in FIG. 2, repeated estimation of the microphone position X and the spectrum S of the sound source signal results in obtaining the following Expression (5).

$$\arg\max_{(X,S)} \log P(X, S, Z) \quad (5)$$

With regard to the spectrum S of the sound source signal, when log P(X,S,Z) is regarded as a function of $S_{nft}$, convexity is guaranteed. The reason convexity is guaranteed is because a quadratic function of $S_{nft}$ is obtained from Expression (2). Thereby, an extreme value is determined to be one, and thus the spectrum $S_{nft}$ of the sound source signal can be analytically obtained. For this reason, the extreme value of the spectrum $S_{nft}$ of the sound source signal can be obtained by obtaining the zero point of a partial derivative with respect to $S_{nft}$ of log P(X,S,Z). Since it is difficult to analytically obtain an extreme value of X, the estimation unit 17 obtains a microphone array position X so as to maximize the following Expression (6) using grid search for testing all parameter combinations.

$$\hat{X} = \underset{X}{\mathrm{argmax}}\, \log P(X, S, Z) \qquad (6)$$
$$= \underset{X}{\mathrm{argmax}} \bigl(\log P(Z \mid S, X) + \log P(X)\bigr)$$

[Description of Processing Procedure]

Next, a procedure of a microphone position estimation process will be described.

Figure 4:
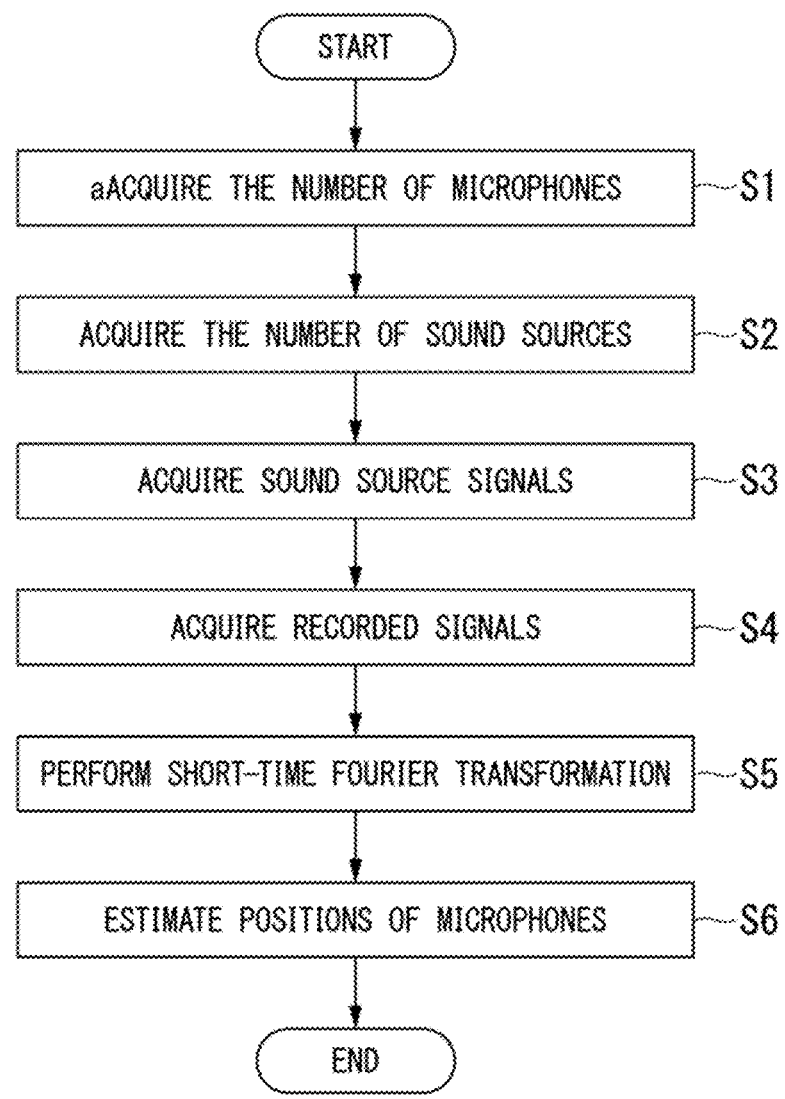
FIG. 4 is a flowchart of a procedure of a microphone position estimation process according to the embodiment.

FIG. 4 is a flowchart of a procedure of a microphone position estimation process according to the present embodiment.

(Step S1) The microphone counting unit 11 acquires the number of microphones.

(Step S2) The sound source counting unit 12 acquires the number of sound sources.

(Step S3) The sound source signal acquisition unit 13 acquires a sound source signal which is output by the sound source 70.

(Step S4) The recorded signal acquisition unit 15 acquires a recorded signal of an M channel which is collected by the microphone array 8.

(Step S5) The first short-time Fourier transformation unit 14 converts a sound source signal which is output by the sound source signal acquisition unit 13 into a signal in a frequency region to calculate a spectrum of the sound source signal. In addition, the second short-time Fourier transformation unit 16 converts a recorded signal of an M channel which is output by the recorded signal acquisition unit 15 into a signal in a frequency region to calculate a spectrum of the sound source signal.

(Step S6) The estimation unit 17 estimates the positions of the microphones 80 constituting the microphone array 8 on the basis of the number of microphones, the number of sound sources, the spectrum of the sound source signal, and the spectrum of the recorded signal which are acquired, using a probability model stored in the storage unit 18.

In the above-described example, although an example in which the estimation unit 17 estimates the position of a microphone array (a position for each microphone) has been described, the present invention is not limited thereto. The estimation unit 17 may acquire the installed position of a microphone and obtain a displacement between the acquired position and an estimated position. In addition, the estimation unit 17 may output a displacement of the estimated position of the microphone array (a displacement of the position for each microphone).

The voice recognition device 2 (FIG. 1) calibrates the position of a microphone using, for example, a displacement of the position of the microphone array which is output by the microphone array position estimation device 1 (a displacement of the position for each microphone). In addition, the voice recognition device 2 corrects, for example, a transfer function on the basis of a calibrated result to perform a sound source localization process and a sound source separation process.

[Evaluation Results]

Next, an example of evaluation results obtained by evaluating the microphone array position estimation device 1 according to the present embodiment will be described. The evaluation was performed through numerical simulation.

Figure 5:
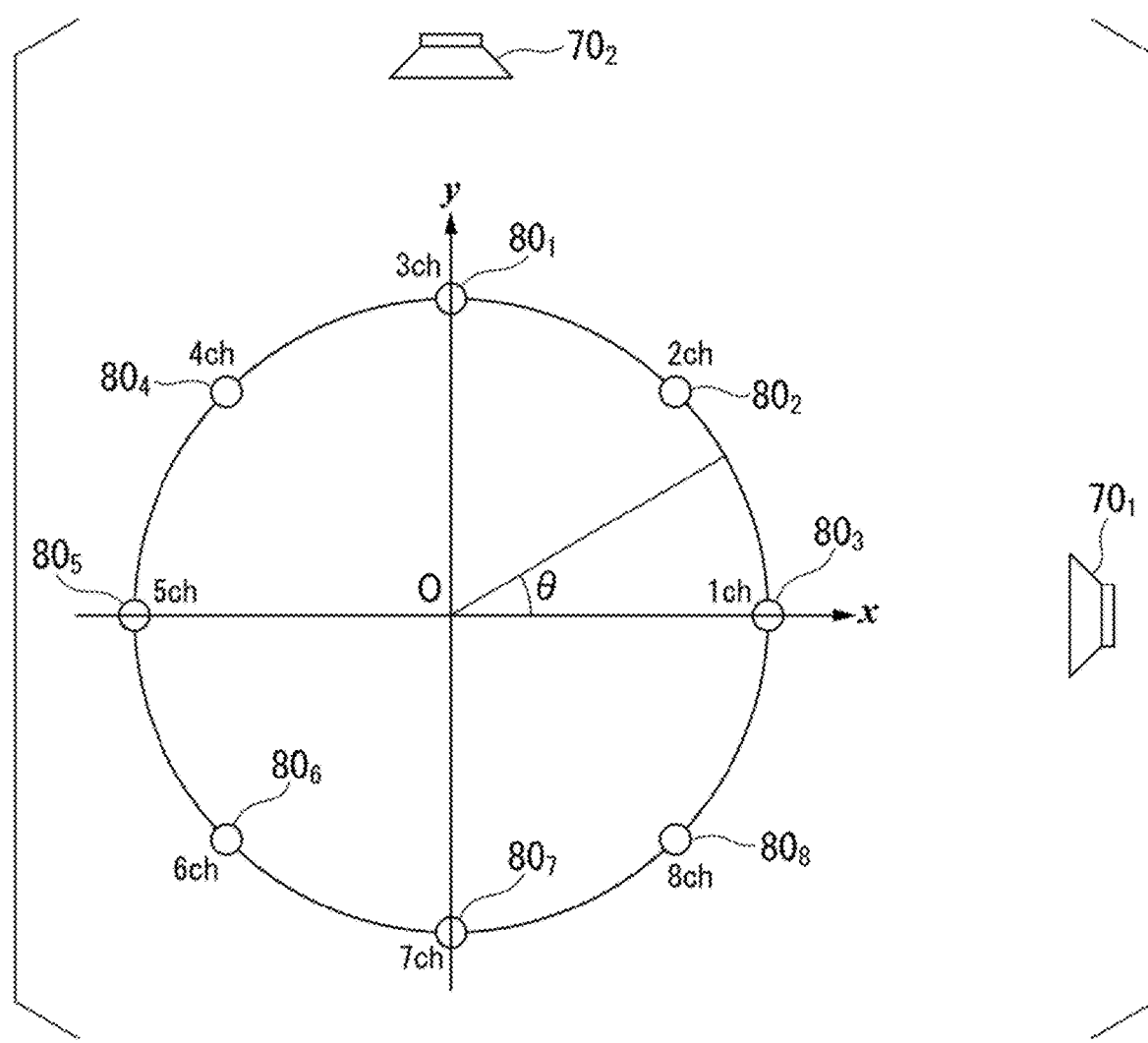
FIG. 5 is a diagram showing an evaluation environment.

The evaluation environment was as follows and as shown in FIG. 5. FIG. 5 is a diagram showing the evaluation environment.

The microphone array 8 included eight microphones 80. The microphones 80 were disposed at equal intervals of 45 degrees in a circumferential shape with a radius of 0.12 [m].

The center of the microphone array 8 defined the reference point O.

The direction in which the first (1ch) microphone $80_1$ and the fifth (5ch) microphone $80_5$ were connected defined the x-axis, and the direction in which the third (3ch) microphone $80_3$ and the seventh (7ch) microphone 807 were connected defined the y-axis.

The counterclockwise direction from the positive x-axis direction defined angle θ, and the first (1ch) microphone $80_1$ defined an angle of 0 degrees.

In addition, experimental conditions were as follows.

I. The first sound source $70_1$ was placed at an angle of 0 degrees, and the second sound source $70_2$ was placed at an angle of 90 degrees.

II. The positions of the first sound source $70_1$ and the second sound source $70_2$ were set to infinity, and the sound source signal was set to a plane wave.

III. A case where only the first sound source $70_1$ was used (Case 1) and a case where the first sound source $70_1$ and the second sound source $70_2$ were used (Case 2) were evaluated.

IV. Evaluation was performed on the assumption that the position of a microphone was calibrated when a displacement of (0.02, 0.02) [m] was given to the first (1ch) microphone $80_1$.

V. The positions of the second (2ch) microphone $80_2, \ldots,$ and the 8-th microphone $80_8$ were fixed.

VI. Sound source signals from two sound sources were not simultaneously recorded by a microphone.

VII. White noise was used for the sound source signal.

In the evaluation, the estimation unit 17 calculated the posterior probability at each point at intervals of 0.001 [m] in FIG. 5 to perform MAP estimation. In addition, since the positions of the second (2ch) microphone $80_2, \ldots,$ and the 8-th microphone $80_8$ were fixed, the prior probability of the position of the microphone was set to $P(X_2)= \ldots =P(X_8)=1$. For this reason, the prior probability P(X) of the position X of the microphone array was equal to a prior probability microphone $P(X_1)$ of the position of the first (1ch) microphone ($P(X)=P(x_1)$).

The variance $\sigma_S^2$ of a spectrum of a sound source signal and the variance $\sigma_Z^2$ of a recorded signal of a microphone were set to $5 \times 10^{-6}$ which was the same as the variance of an input sound. In addition, a variance $\sigma^2$ of a microphone array position was set to $4 \times 10^{-4}$ [m²] when a disposition with an accuracy of approximately 0.02 [m] was assumed.

Figure 6:
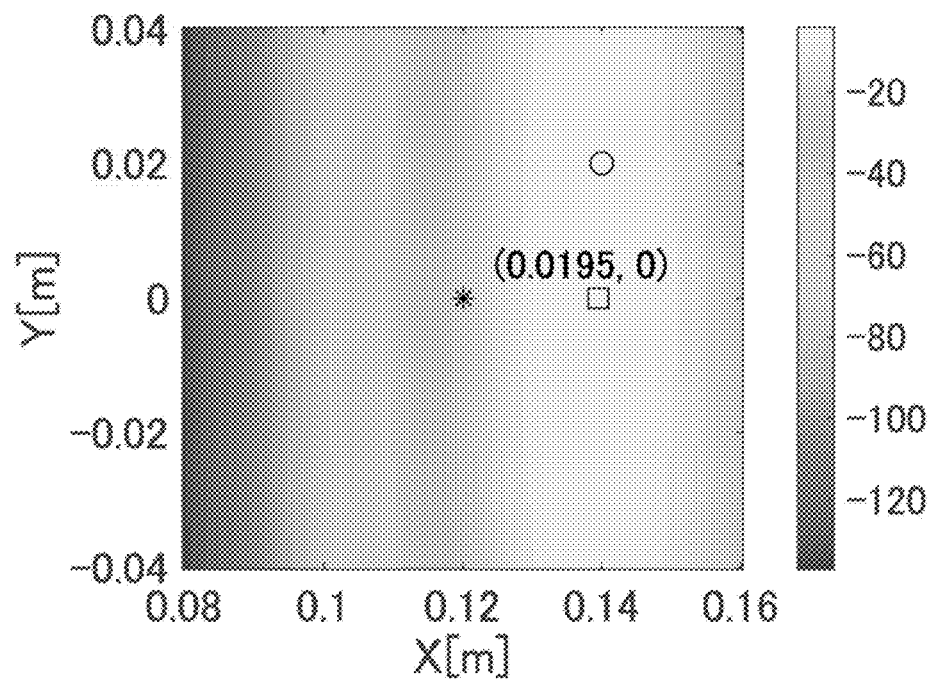
FIG. 6 shows evaluation results in a case where a first sound source is used.
Figure 7:
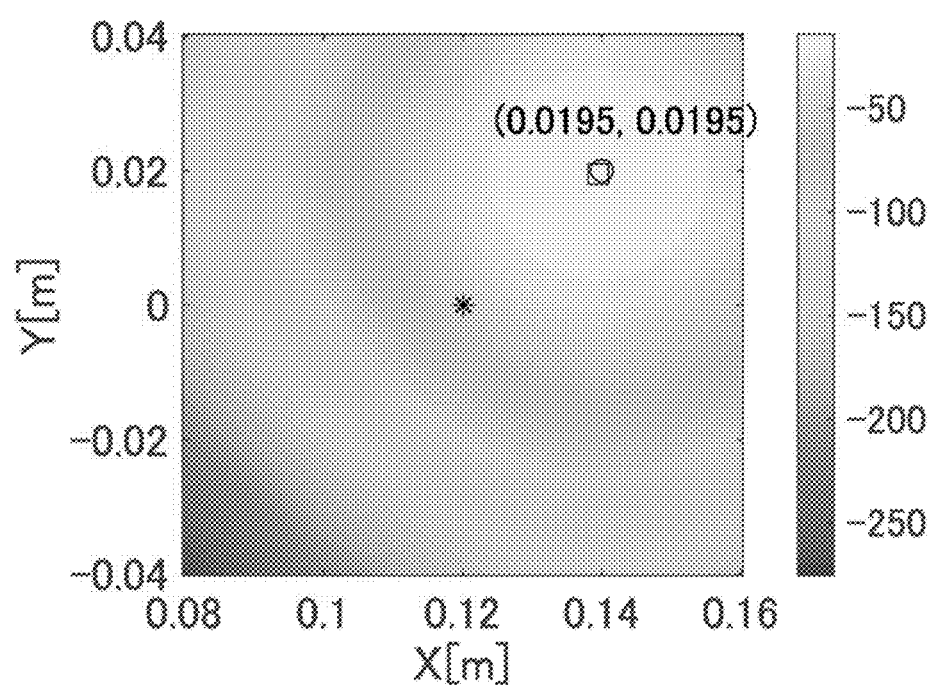
FIG. 7 shows evaluation results in a case where the first sound source and a second sound source are used.

FIG. 6 shows evaluation results in a case where the first sound source $70_1$ was used (Case 1). FIG. 7 shows evaluation results in a case where the first sound source $70_1$ and the second sound source $70_2$ were used (Case 2). In FIGS. 6 and 7, the horizontal axis is the X [m] direction, and the vertical axis is the Y [m] direction. In addition, the asterisk g11 indicates a reference position, the void square indicates an estimated position of the first (1ch) microphone $80_1$ (=an estimated position of the microphone array 8), and the white circle indicates the true value of the first (1ch) microphone $80_1$ (=the true value of the microphone array 8). Further, in FIGS. 6 and 7, a contrasting density represents the value of log P(Z|S,X). Additionally, the true value of the first (1ch) microphone $70_1$ is (0.14, 0.02) [m].

FIG. 8 is a diagram showing a displacement in the x-axis direction and a displacement in the y-axis direction in the evaluation of Case 1 and the evaluation of Case 2. In FIG. 8, in Case 1, a displacement in the x-axis direction was 0.02 [m], and a displacement in the y-axis direction was −0.002

[m]. In Case 2, the displacement in the x-axis direction was 0.02 [m], and the displacement in the y-axis direction was 0.02 [m].

As shown in FIGS. 6 and 8, when the first sound source $70_1$ was used (Case 1), it was possible to accurately estimate a displacement in the x-axis direction at the position of the first microphone $80_1$(1ch).

As shown in FIGS. 7 and 8, when the first sound source $70_1$ and the second sound source $70_2$ were used (Case 2), it was possible to accurately estimate the displacement in the x-axis direction and a displacement in the y-axis direction at the position of the first microphone $80_1$(1ch).

As in the evaluation results shown in FIGS. 6 to 8, according to the present embodiment, it is possible to detect (estimate) a displacement at the position of the microphone 80. In addition, as in the evaluation results shown in FIGS. 6 to 8, according to the present embodiment, it is possible to detect (estimate) a displacement in the x-axis direction and a displacement in the y-axis direction at the position of the microphone 80 by using recorded signals of sound sources from two different directions.

As described above, in the present embodiment, the position of a microphone array was set to X, the spectrum of the sound source was set to S, the spectrum of the recorded sound was set to Z, the prior probability of X was represented by P(X), a prior probability of S was represented by P(S), a conditional probability of Z when X and S were given was represented by P(Z|S,X), a simultaneous probability P(X,S,Z) of X, S, and Z was represented by log P(X,S,Z)=log P(Z|S,X)+log P(S)+log P(X), and X for maximizing the simultaneous probability was obtained through repeated estimation of S and X.

Thereby, according to the present embodiment, it is possible to probabilistically obtain a displacement at the position of a microphone array (the position of a microphone) by introducing a prior distribution of a microphone array position and a probabilistic generation model. As a result, according to the present embodiment, it is possible to accurately estimate positions of microphones constituting a microphone array when recording is performed using the microphones.

All or some of the processes performed by the microphone array position estimation device 1 may be performed by recording a program for realizing all or some of the functions of the microphone array position estimation device 1 in the present invention by a computer-readable recording medium and by causing a computer system to read and execute the program recorded in the recording medium. It is assumed that the "computer system" as mentioned herein may include hardware such as OS and peripheral devices. In addition, it is assumed that the "computer system" also includes a WWW system including a homepage providing environment (or a display environment). In addition, the "computer-readable recording medium" refers to a portable medium such as a flexible disc, a magneto-optical disc, a ROM, or a CD-ROM, or a storage device such as a hard disk built into the computer system. Further, it is assumed that the "computer-readable recording medium" also includes a medium holding the program for a certain period of time like a volatile memory (RAM) inside the computer system serving as a server or a client in a case in which the program is transmitted through a network such as the Internet or through a communication line such as a telephone line.

In addition, the above-described program may be transmitted from the computer system in which the program is stored in a storage device or the like to another computer system through a transmission medium or by transmitted waves in the transmission medium. Here, the "transmission medium" transmitting the program refers to a medium having a function of transmitting information like a network (communication network) such as the Internet or a communication line (communication wire) such as a telephone line. In addition, the above-described program may be a program for realizing a portion of the above-described functions. Further, the above-described program may be a so-called differential file (differential program) capable of realizing the above-described functions in combination with a program which is recorded in the computer system in advance.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and should only be considered to be limited by the scope of the appended claims.

What is claimed is:

1. A microphone array position estimation device comprising:
    an estimation unit configured to estimate a position X of a microphone array for maximizing a simultaneous probability P(X,S,Z) of X, Y, and Z through repeated estimation of S and X when the position of the microphone array constituted by M (M is an integer of 1 or greater) microphones is set to X $(=(X_1^T, \ldots, X_M^T)^T$, T indicates a transposition), spectrums of sound source signals output by the N (N is an integer of 1 or greater) sound sources are set to S (a set related to all of n, f, and t of $S_{nft}$, f is a frequency bin, and t is a frame index), and spectrums of recorded signals collected by the microphone array are set to Z (a set related to all of f and t of $Z_{ft}$).

2. The microphone array position estimation device according to claim 1, wherein the estimation unit estimates the position X of the microphone array by randomly initializing $X^{(0)}$ and $S^{(0)}$ and then performing repeated estimation until the following two expressions are converged $$X^{(t+1)} \leftarrow \underset{X}{\mathrm{argmax}}\ \log P(X, S^{(t)} \mid Z)$$

$$S^{(t+1)} \leftarrow \underset{X}{\mathrm{argmax}}\ \log P(X^{(t+1)}, S \mid Z).$$

3. The microphone array position estimation device according to claim 2, wherein the estimation unit estimates the position X of the microphone array by estimating X^ for maximizing the following function using grid search $$\hat{X} = \underset{X}{\mathrm{argmax}}\ \log P(X, S, Z)$$
$$= \underset{X}{\mathrm{argmax}}\bigl(\log P(Z \mid S, X) + \log P(X)\bigr).$$

4. The microphone array position estimation device according to claim 2, wherein the estimation unit
    sets a probability model of a probability P(X,S,Z) to be the following expression on the basis of a space model, log P(X,S,Z)=log P(Z|S,X)+log P(S)+log P(X)

sets a first term log P(Z|S,X) on the right side to be the following expression (sign c above an equal sign is an equal sign indicating that the right side and the left side are correct except for a constant term, * represents a complex conjugate, and $\sigma_Z^2$ represents a variance of a recorded signal of the microphone array) on the assumption that it conforms to a complex normal distribution in which a product of the spectrum S of the sound source signal and a transfer function $R_{nmf}$ is set to an average, $$\log P(Z|S,X) \stackrel{c}{=} -\sum_m \sum_f \sum_t \frac{\left(Z_{mft} - \sum_n R_{nmf} S_{nft}\right)^* \left(Z_{mft} - \sum_n R_{nmf} S_{nft}\right)}{\sigma_Z^2}$$

sets a second term log P(S) on the right side to be the following expression ($\sigma_S^2$ represents a variance of a spectrum of a sound source signal) on the assumption that it conforms to a complex normal distribution in which $S_{nft}$ is set to an average of 0, and $$\log P(S) \stackrel{c}{=} -\sum_n \sum_f \sum_t \frac{S_{nft}^* S_{nft}}{\sigma_S^2}$$

sets a third term log P(X) on the right side to be the following expression ($\sigma^2$ represents a variance of a microphone array position) on the assumption that relative positions of the microphones constituting the microphone array are independent of each other for each microphone, displacements of the microphones at the position X are in the same direction, and the position X of the microphone array conforms to a normal distribution in which $X^-$ is set to an average.

$$\log P(X) = \sum_m \log P(X_m)$$
$$\stackrel{c}{=} -\sum_m \frac{(X_m - \overline{X}_m)^T (X_m - \overline{X}_m)}{2\sigma^2}.$$

5. A microphone array position estimation method comprising:
a procedure of causing a microphone counting unit to acquire the number of microphones (M is an integer of 1 or greater) included in a microphone array;
a procedure of causing a sound source counting unit to acquire the number of sound sources N (N is an integer of 1 or greater);
a procedure of causing a first short-time Fourier transformation unit to perform short-time Fourier transformation on a sound source signal for each sound source to calculate a spectrum of the sound source signal;
a procedure of causing a second short-time Fourier transformation unit to perform short-time Fourier transformation on a recorded signal for each microphone to calculate a spectrum of the recorded signal; and
a procedure of causing an estimation unit to estimate a position X of a microphone array for maximizing a simultaneous probability P(X,S,Z) of X, Y, and Z through repeated estimation of S and X when the position of the microphone array is set to X $(=(X_1^T, \ldots, X_M^T)^T$, T indicates a transposition), spectrums of sound source signals output by the N sound sources are set to S (a set related to all of n, f, and t of $S_{nft}$, f is a frequency bin, and t is a frame index), and spectrums of recorded signals collected by the microphone array are set to Z (a set related to all of f and t of $Z_{ft}$), by using the number of sound sources N, the number of microphones M, the spectrums of the sound source signals, the spectrums of the recorded signals, and a probabilistic generation model used to estimate the position X of the microphone array.

6. A non-transitory computer-readable storage medium storing a program causing a computer for microphone array position estimation to execute:
a procedure of acquiring the number of microphones (M is an integer of 1 or greater) included in a microphone array;
a procedure of acquiring the number of sound sources N (N is an integer of 1 or greater);
a procedure of performing short-time Fourier transformation on a sound source signal for each sound source to calculate a spectrum of the sound source signal;
a procedure of performing short-time Fourier transformation on a recorded signal for each microphone to calculate a spectrum of the recorded signal; and
a procedure of estimating a position X of a microphone array for maximizing a simultaneous probability P(X, S,Z) of X, Y, and Z through repeated estimation of S and X when the position of the microphone array is set to X $(=X_1^T, \ldots, X_M^T)^T$, T indicates a transposition), spectrums of sound source signals output by the N sound sources are set to S (a set related to all of n, f, and t of $S_{nft}$, f is a frequency bin, and t is a frame index), and spectrums of recorded signals collected by the microphone array are set to Z (a set related to all of f and t of $Z_{ft}$), by using the number of sound sources N, the number of microphones M, the spectrums of the sound source signals, the spectrums of the recorded signals, and a probabilistic generation model used to estimate the position X of the microphone array.

* * * * *